Aug. 7, 1951
G. TURRALL ET AL
2,563,492
MACHINE FOR SEPARATING AND FEEDING
COUNTED BATCHES OF ARTICLES
Filed Oct. 6, 1948
3 Sheets-Sheet 1
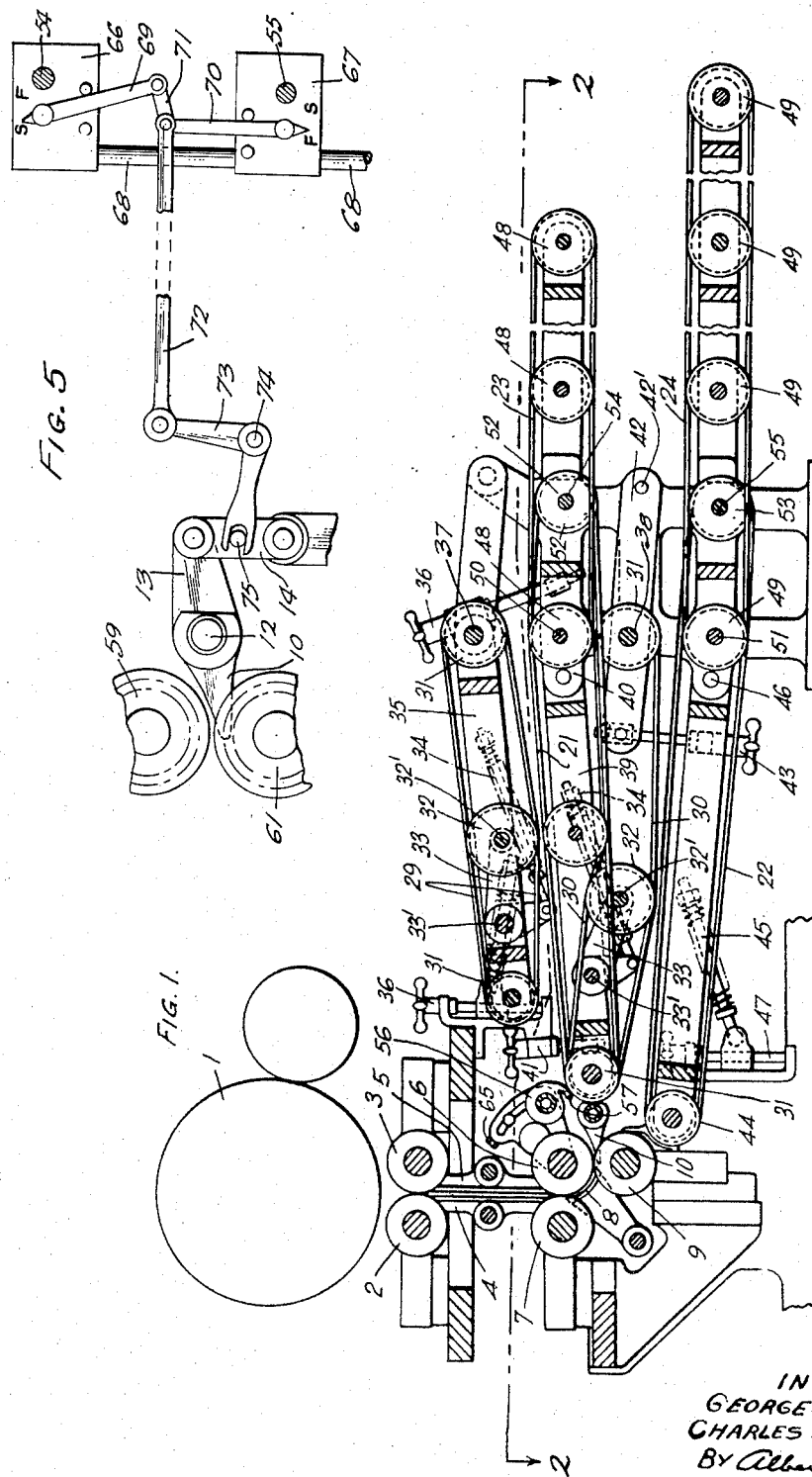
INVENTORS.
GEORGE TURRALL
CHARLES H. SKINNER
By Albert J. Horton
ATTORNEY

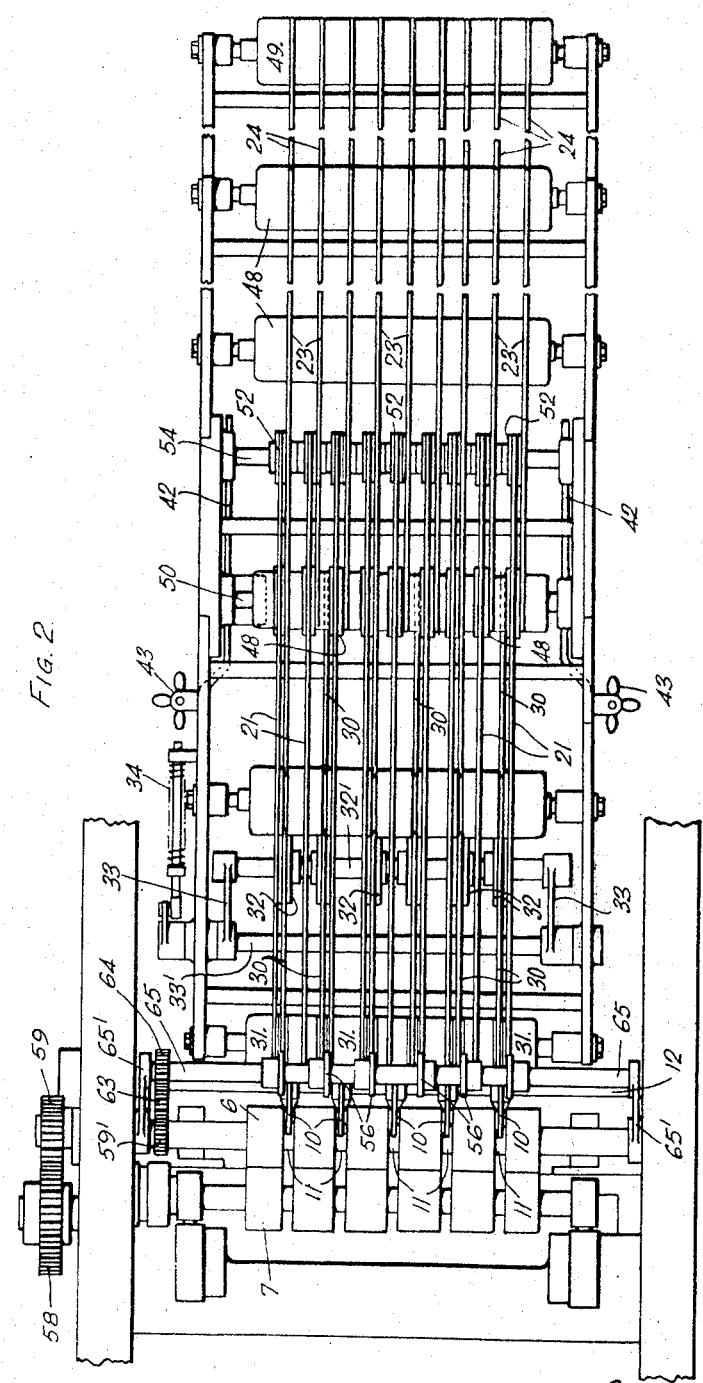

Aug. 7, 1951
G. TURRALL ET AL
2,563,492
MACHINE FOR SEPARATING AND FEEDING
COUNTED BATCHES OF ARTICLES
Filed Oct. 6, 1948
3 Sheets-Sheet 3
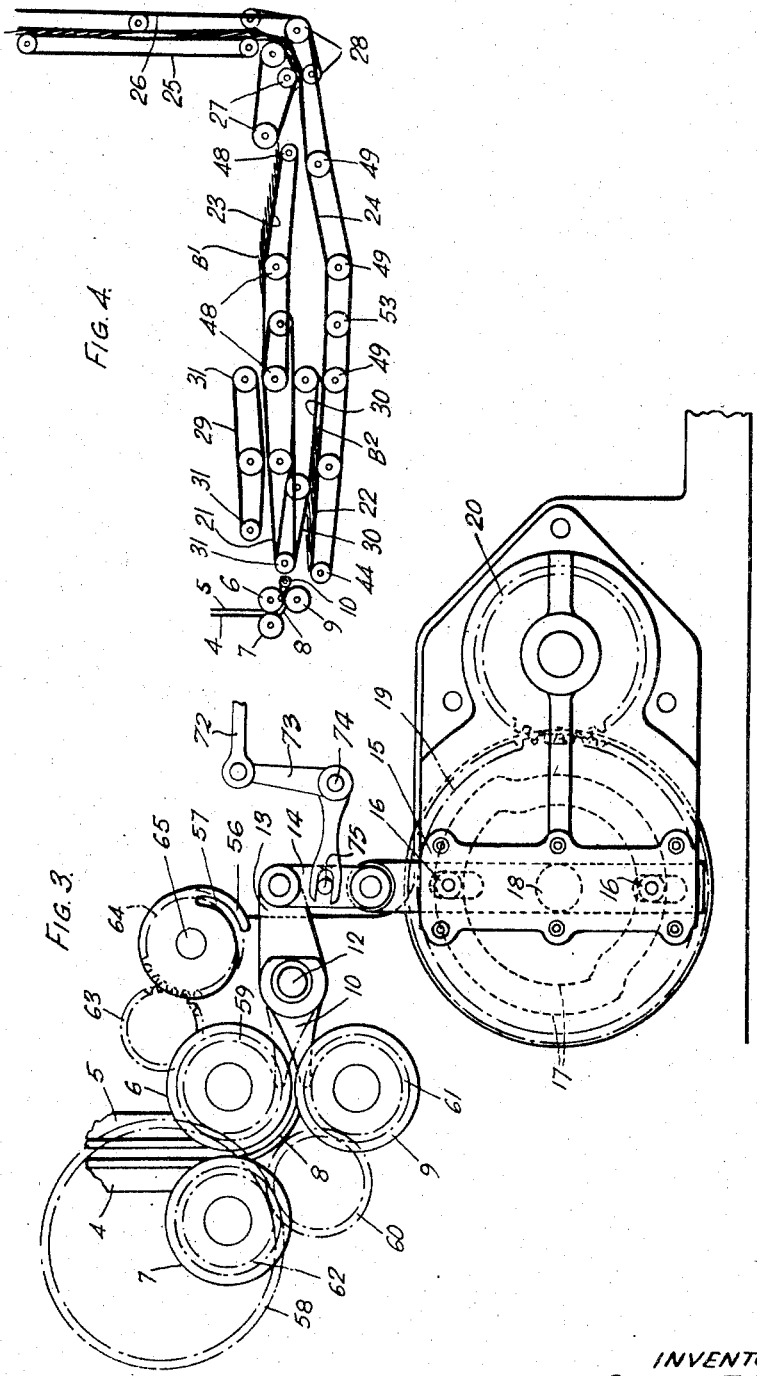
INVENTORS.
GEORGE TURRALL
CHARLES H. SKINNER
BY Albert J Horton
ATTORNEY Patented Aug. 7, 1951

2,563,492

UNITED STATES PATENT OFFICE 2,563,492

MACHINE FOR SEPARATING AND FEEDING COUNTED BATCHES OF ARTICLES

George Turrall and Charles Henry Skinner, London, England, assignors to R. Hoe & Co., Inc., New York, N. Y., a corporation of New York Application October 6, 1948, Serial No. 53,098
In Great Britain March 3, 1945

8 Claims. (Cl. 271—64)

This invention relates to improvements in arrangements for counting the products of machines such as printing machines from which the products issue in a folded flat condition, and this application is a continuation-in-part of our application Serial No. 650,671, on which U. S. Patent 2,484,196 was granted October 11, 1949.

The main object of the invention is to provide improved mechanism by which counting of the products is effected by separating a continuous stream of successive products into separated batches each consisting of a predetermined number of products. This object is achieved, broadly stated, by diverting the products at count intervals (as they emerge from the machine) to different travelling supports, and while products to make up one batch are being directed to one support, the support to which the products were previously diverted is speeded up to separate (in the sense of movement of the batches), the batch on that support, from the batch being completed at this time. The batches are taken in turn by conveying means which is travelling continuously at accelerated speed so that the separation between the batches is maintained and the batches pass away in a stream to a collection point.

The supports may be constituted by endless conveyors which are moved at a regular speed in the sense of delivery and are accelerated at intervals. They are preferably arranged to move in different planes, and a switch device is employed to divert the products first to one support and then to the other support, the switch being operated at count intervals.

The speeding up operation is effected intermittently, first on one support and then on the other, and due to this speeding up action, it will be obvious that the batches will not only be separated at different levels, but the trailing extremity of one batch at one level will not be in vertical register with the leading extremity of the next delivered batch on the other level, but will in fact be ahead of vertical register, due to the acceleration which caused the gap.

The speed at which the travelling supports move when receiving products is preferably so related to the rate of delivery of the products to them, that the products are deposited thereon in closely overlapped relation, and means are provided to accelerate each support while it is carrying a completed batch of products and while products to form the following batch are being directed to the other support.

The invention is illustrated in the accompanying drawings in which Figure 1 is a longitudinal sectional elevation, Figure 2 is a plan view with certain parts omitted, and as seen on line 2 of Figure 1 in the direction of the arrows, Figure 3 a detailed elevation of a portion of the mechanism drawn to a larger scale, Figure 4 is a diagrammatic side view, and Figure 5 is a side view of a power transmitting device suitable for driving the travelling supports.

The invention is shown applied to a delivery which receives folded products passing from a conventional folding mechanism of a printing printing machine. The folding mechanism, as best shown in Figure 1, comprises a folding cylinder 1 having folding-off blades (not shown) which are operated in the usual manner and projected beyond the periphery of the cylinder 1 to press the central part of a product on the cylinder, between the nip of folding-off rollers 2, 3 from between which the products will issue in succession with their folded edges leading. The operation of this class of mechanism is well known and it is considered unnecessary to describe it further. Thus so far as concerns this invention, there pass from the rollers 2, 3, a succession of products to be handled by the delivery mechanism of the invention.

The purpose of the mechanism, which is best shown in Figures 1 and 3, is to enable the products to be separated in counted batches which pass in regular succession with the batches spaced apart in the stream. The products issuing from the folding-off rollers 2, 3 pass down between guides 4, 5 to rollers 6, 7, which advance the copies to curved plates 8 operating to change the direction of the copies from the vertical to the horizontal, the rollers 6 cooperating with another roller 9, to project the copies in a sensibly horizontal direction.

Immediately on the discharge side of these rollers 6 and 9 are switches or deflectors 10 which are movable in grooves 11 formed in these rollers as is seen in Figures 2 and 3. These switches are mounted on a shaft 12 which has an arm 13 coupled by a link 14 to an actuating component 15 having cam followers 16 engaged by a box cam 17 fixed on a shaft 18. The shaft 18 is driven through gears 19, 20 from some rotating part of the machine so that the speed of the cam is related to the rate at which products pass from the rollers 6, 9.

These switches are disposed in the region of the ends of two superposed travelling supports or conveyors each in the form of sets of endless conveyor belts or tapes 21, 22. The function of the switch device is to deflect products first to the belts 21 of one conveyor and then (after a predetermined number of products has passed thereto), to deflect the next batch of products to the belts 22 of the other conveyor, and so on.

Thus the switch 10 in one extreme position diverts products issuing from between the rollers 6 and 9 to the lower conveyor belts 22 and in the other extreme position it diverts the products to the upper conveyor belts 21. The switch 10 is held by the cam 17 in one extreme position while the copies to form a batch pass, say, to the lower conveyor belts 22 which are moving continuously so that the copies are laid down, lying mostly over one another with a pitch that is dependent on the speed of the belts, and are conveyed towards the take-off end of the equipment. As the last copy of this batch is being delivered to the lower conveyor belts 22, the switch 10 is operated by the cam 17 to divert the next copy issuing from between the rollers 6 and 9 to the upper conveyor belts 21, which are also moving continuously and upon which as a result the products are laid down, the switch remaining in this position until the final copy of the next batch has been diverted to the upper conveyor belts, whereupon the switch 10 is reversed to divert copies to the lower conveyor belts and so on.

The products have so far merely been divided into batches travelling at different levels. In order to establish a gap between the batches in their sense of travel, mechanism is provided to accelerate a counted batch delivered to the conveyor belts 21 during the time that the next batch is being formed on the conveyor belts 22, and similarly to accelerate a batch delivered to the belts 22 during the time that the next batch is being formed on the belts 21. Additional conveyor belts or tapes 23, 24 are continuously driven at a speed greater than that at which the conveyor belts 21 or 22 are driven during the periods in which the conveyor belts 21, 22 are receiving products; the preferred speed of the conveyor belts 23 and 24 being substantially the same as the speed to which the conveyor belts 21 and 22 are accelerated in the periods they are not receiving products. The paths of the conveyor belts 21 and 22 overlap the paths of the high speed conveyor belts 23 and 24 respectively, so the products may pass smoothly from the former to the latter.

Thus the batches having been received on the conveyor belts 21 during a period when they are driven at slow speed, will be forwarded rapidly to the high speed conveyor belts 23 when the speed of the conveyor belts 21 is accelerated. Similarly and in alternation with the conveyor belts 21 the conveyor belts 22 will receive a batch of products at slow speed and when they are accelerated, the batch they carry will be delivered to the high speed conveyor belts 24, the operation being timed so that while one batch is being laid on the conveyor belts 21 the batch previously laid and completed on the conveyor belts 22 is being forwarded to the conveyor belts 24 at the accelerated speed. Thus it will be seen that the batches will not only be separated at different levels, but that due to the acceleration, the batches will not form (in the sense of movement) continuations with other batches, but they will in effect be spaced apart. It is now merely necessary to combine in a single stream moving at the speed of the conveyor belts 23 and 24, the counted and now separated batches, to provide the desired continuous stream of separated batches. For this purpose, the batches are taken first from one set of high speed conveyor belts 23 or 24 and then from the other set by a take-away conveyor moving preferably at the speed of the high speed conveyors 23, 24.

The take-away conveyor as shown in Figure 4, comprises wires 25, 26 and pulleys 27, 28, that are disposed so as to form a receiving jaw into which the batches of products on the high speed conveyor belts 23, 24 pass, and from this point they are taken away, as for example, to a publishing room. This figure illustrates diagrammatically the disposition of a number of batches. On the upper high speed conveyor belts 23 is indicated a complete batch B', which has been accelerated and is being conveyed at the higher speed, while on the lower conveyor belts 22 (which are moving at slow speed), the batch B2 is still being completed. A gap between batches B' and B2 has thus been formed at this time. Obviously, as the conveyor belts 23 present the batch B' thereon to the wires 25, 26 of the take-away conveyor, the gap formed between the two batches B' and B2, is maintained, and when the batch B2 on the conveyor belts 22 has been completed and accelerated, the preceding batch is being carried away by the wires 25, 26 of the take-away conveyor and so maintains the gap.

For the upper conveyor belts 21, it may be desirable to provide adjacent the point at which products pass to it from the switch 10, control belts 29 which are driven at the speed of the conveyor belts 21, 22, and will hold down and form with the belts 21, a passage for the control of the products. The same arrangement may as shown, be applied to the lower conveyor belts 22, the control belts being indicated at 30 and in either case these control belts 29, 30 would be capable of yielding bodily so that in the event of a jam occurring the belts would yield to allow the jam to clear.

For this purpose, the control belts 29, 30 pass around pulleys 31 and over pulleys 32 carried on shafts 32' (Figures 1 and 2) at the outer ends of the arms 33 which are pivotally supported by shafts 33' and biased by springs 34 so that the pulleys 32 can yield.

The position of the various belts as to their separation is also adjustable to suit the particular products being dealt with. For this purpose, the pulleys 31 of the control belts 29 are carried by a frame 35 which is bodily adjustable by screw arrangements 36 at each end. The forward pulleys 31 of the control belts 30 are, together with co-axial but separate pulleys for the lower conveyor belts 21 carried by a frame 39 pivoted at 40 and adjustable by screw mechanism 41. Rear pulleys 31 for the control belts 30 are carried by a frame 42 pivoted at 42' and adjustable by screw arrangements 43. The lower conveyor belts 22 pass at their forward ends around pulleys 44 carried by a frame 45 pivoted at 46 and adjustable by a screw arrangement 47.

The high speed conveyor belts 23, 24 pass over pulleys 48 and 49 respectively, the forward pulleys 48 and 49 being fixedly mounted on shafts 50, 51 respectively, which are driven by a suitable connection with a rotating member of the machine. On these shafts 50 and 51, are also loosely mounted, guide pulleys over which the belts 21, 22 pass respectively to pulleys 52, 53 fixed on the driving shafts 54, 55. The control belts 29 are driven by pulleys fixed on the shaft 37 which may be driven from the shaft 54 by a crossed belt (not shown) or other suitable means, and the control belts 30 are driven by pulleys on the shaft 38 by a similar connection to the shaft 55. Each set of control belts thus moves at the same speed as the conveyor belts with which it cooperates.

In order to control the movement of the copies as they pass from the rollers 6, 9 to the upper conveyor belts 21, there may be provided control discs 56 each having a curved slot 57 formed in its periphery. The discs are driven at a peripheral speed corresponding to the speed of advance of the products so that any impetus which the product may have obtained is absorbed by the end wall of the slot into which the product passes. The product is thus smoothly laid down on the conveyor belts 21; moreover it will be seen that the tongues which overhang the slots 57 operate as the discs rotate, as smoothers to smooth down the products as they lie on the conveyor. The discs are mounted on a shaft 65 carried at its ends in adjusting plates 65' to enable the setting of the discs to be regulated.

For the purpose of obtaining the required rotation of the rollers 6, 7 and 9, and of the control discs 56, the gearing arrangement shown in Figure 3 is employed. A driving gear 58 is in mesh with a gear 59 on the roller 6 and with a gear 60 which in turn meshes with a gear 61 on the roller 9 and a gear 62 on the roller 7. In addition, a gear 59' on the roller 6 is connected by an intermediate gear 63 with a gear 64 on the shaft 65 carrying the control discs 56. This arrangement thus provides a compact gear train affording the correct direction rotation of the various components concerned.

It will be obvious that in the arrangement described, the switch 10 need be only of light construction since it is merely called upon to divert the printed copies, and it will have a relatively slow action since it can operate to effect the diversion, over a period between the passage of products which is approximately equal to the time taken for one of the products to pass a given point.

It is apparent that when the switch 10 is turned upward to deflect the products to the lower conveyor belts 22, these belts must be driven at slow speed in order that the products may be received on the belts in closely lapped relation, but when the switch 10 is thrown downward so as to deflect the products to the upper conveyor belts 21, these belts must be driven at slow speed, and at this time the conveyor belts 22 will be accelerated to quickly pass the batch of products they are then carrying to the high speed conveyor belts 24. The acceleration of each set of conveyor belts 20 or 21 and the simultaneous deceleration of the other set, is therefore preferably effected by the same mechanism that operates the switch 10.

The conveyor belts 21 are driven by pulleys secured to the shaft 54 while the conveyor belts 22 are driven by pulleys secured to the shaft 55, these belts 21 and 22 being the belts that are driven part of the time at low speed and part of the time at higher speed.

Any suitable means may be employed for connecting the shafts 54 and 55 to rotating elements of the machine in such manner that each shaft may be driven at either the high or the low speed as required, the controlling mechanism being arranged to rotate the shaft 54 at slow speed when the shaft 55 is rotated at high speed and vice versa, with provision for making the speed changes in proper timed relation with the operation of the switch 10.

One suitable arrangement is shown in Figure 5 wherein change speed gear boxes 66 and 67 are supported on the conveyor side frames to receive extending portions of the shafts 54 and 55 respectively. These gear boxes are both connected to a driving shaft 68, preferably driven by the machine, and are arranged to drive the shafts 54 and 55 at either of two speeds, depending on the position of control arms 69 and 70. The arm 69 is shown in the "slow" position in Figure 5, and the arm 70 in the "fast" position.

These control arms are connected by a link 71, and a rod 72 pivotally connected to the upper end of arm 70, extends to a pivotal connection with an arm of a bell crank lever 73 pivoted on a suitably supported stud 74. The other arm of the lever 73 is slotted to engage a roller or pin 75 carried by the link 14 (Figure 3). With the link 14 in the position shown in Figure 3, the products will be deflected to the upper conveyor belts 21. The rod 72 and the control arm 69 will then be in the position shown in Figure 5, and the shaft 54 and the belts 21 will be driven at the slow speed. At the same time, the control arm 70 will be in position to drive the shaft 55 and thereby the belts 22 at the high speed. When the switch 10 is thrown in the opposite direction by a downward motion of the link 14, the control arms 69 and 70 will be moved so that the shaft 55 will be driven at slow speed and the shaft 54 at high speed. Thus, movement of the switch operating mechanism, will be accompanied by acceleration of the products carried by the conveyor belts 21 and 22, in properly timed relation to deliver them to the belts 23 and 24, in separated batches.

It will be seen that if the shafts 50 and 51 are driven by suitable connections with the shafts 52 and 53 respectively, instead of from some constantly rotating member of the machine, the belts 23 and 24 will in effect become extensions of the belts 21 and 22 respectively. The belt 23 at all times will then be driven at the same speed as the belt 21, and the speed of the belt 24 will correspond with that of the belt 22. With such an arrangement, the belts 23 and 24 would be driven part of the time at slow speed, but by properly proportioning the length and speed of the belts, each batch would be taken by the take-away conveyor during a period when the belt that is carrying it, is running at high speed, and the batches would be properly spaced between the wires 25 and 26.

It will be understood that the invention may be embodied in other specific forms without departing from the spirit or essential attributes thereof, and it is therefore desired that the present embodiment be considered in all respects as illustrative and not restrictive, reference being had to the claims rather than to the foregoing description to indicate the scope of the invention.

What we claim is:

1. To deliver successively printed products in counted and separated batches, apparatus comprising a pair of endless continuously travelling batch-receiving conveyors, means to direct automatically from a stream of products a number of products representing a batch first to one batch-receiving conveyor and then a similar number of products to the other batch-receiving conveyor, means to accelerate each one of the said conveyors while a batch is being delivered to the other conveyor so as to establish separation between the batches in their sense of movement and an endless take-away conveyor moved continuously sensibly at the speed of the accelerated batches and to which the accelerated batches are delivered in turn from the two batch-receiving conveyors.

2. In a printing machine delivery mechanism arranged to receive relatively flat products in lapped relation and in a continuous stream, and having means to arrange the products in batches each having a predetermined number of products, the combination therein of a pair of conveyors providing alternate paths for the products, a switch operated periodically by the machine to direct the batches of products alternately, first to one conveyor and then to the other, speed change mechanism operated synchronously with the operation of the switch to increase the speed of each conveyor during periods when products are deflected to the other conveyor, and a take-away conveyor positioned to receive, one at a time, the separated and spaced batches of products directed alternately to each of the pair of conveyors.

3. In a printing machine delivery mechanism arranged for separating a continuous stream of products into a stream of separated counted batches of products, a pair of conveyors, switch mechanism operable to direct a predetermined number of successive products in a continuous stream to each conveyor alternately to form separated batches of counted products, means to drive each conveyor at a relatively slow speed while it is receiving products and means operated in timed relation with the switch mechanism to accelerate the speed of each conveyor while the other conveyor is receiving products.

4. In a printing machine delivery mechanism arranged for separating a continuous stream of products into a stream of separated counted batches of products, a pair of conveyors, switch mechanism operable to direct a predetermined number of successive products in a continuous stream to each conveyor alternately to form separated batches of counted products, a changeable speed driving mechanism operable in synchronism with the switch mechanism to simultaneously drive a first conveyor of the pair at high speed and a second conveyor of the pair at slow speed during certain periods and to simultaneously drive the first conveyor at slow speed and the second conveyor at high speed during intervening periods.

5. In a printing machine delivery mechanism arranged for separating a continuous stream of products into a stream of separated counted batches of products, a pair of conveyors, switch mechanism operable to direct a predetermined number of successive products in a continuous stream to each conveyor alternately to form separated batches of counted products, a speed change device associated with each conveyor, means to drive each conveyor at a slow speed to receive the products in closely lapped relation, and control means for the speed change device interconnected with the switch mechanism to accelerate the movement of each conveyor immediately following each period in which it receives products.

6. In a printing machine delivery mechanism arranged for separating a continuous stream of products into a stream of separated counted batches of products, a pair of conveyors, switch mechanism operable to direct a predetermined number of successive products in a continuous stream to each conveyor alternately to form separated batches of counted products, a speed change device associated with each conveyor, means to drive each conveyor at a slow speed to receive the products in closely lapped relation, control means for the speed change device interconnected with the switch mechanism to accelerate the movement of each conveyor to a higher speed immediately following each period in which it receives products, and a take-away conveyor driven at a speed approximating the said higher speed and positioned to carry the separated batches of products away from both conveyors.

7. In a printing machine delivery mechanism arranged for separating a continuous stream of products into a stream of separated counted batches of products, a pair of conveyors, switch mechanism operable to direct a predetermined number of successive products in a continuous stream to each conveyor alternately to form separated batches of counted products, a speed change device associated with each conveyor, means to drive each conveyor at a slow speed to receive the products in closely lapped relation, control means for the speed change device interconnected with the switch mechanism to accelerate the movement of each conveyor immediately following each period in which it receives products, and to decelerate the movement immediately before each period in which it receives products.

8. In a printing machine delivery mechanism arranged for separating a continuous stream of products into a stream of separated counted batches of products, a pair of conveyors, switch mechanism operable to direct a predetermined number of successive products in a continuous stream to each conveyor alternately to form separated batches of counted products, a speed change device associated with each conveyor, means to drive each conveyor at a slow speed to receive the products in closely lapped relation, and control means for the speed change device interconnected with the switch mechanism to cause low speed movement of each conveyor during periods in which it is receiving products and high speed movement during other periods.

GEORGE TURRALL.
CHARLES HENRY SKINNER.

REFERENCES CITED

The following references are of record in the file of this patent:

UNITED STATES PATENTS

| Number | Name | Date |
| --- | --- | --- |
| 269,159 | Crowell | Dec. 12, 1882 |
| 862,148 | Filteau | Aug. 6, 1907 |
| 1,947,396 | Jaite | Feb. 13, 1934 |
| 2,328,859 | Taylor | Sept. 7, 1943 |
| 2,484,196 | Turrall et al. | Oct. 11, 1949 |